(12) United States Patent
Haas et al.

(10) Patent No.: US 11,884,173 B2
(45) Date of Patent: Jan. 30, 2024

(54) NETWORK-BASED ENERGY MANAGEMENT OF ELECTRIC VEHICLE (EV) CHARGING NETWORK INFRASTRUCTURE

(71) Applicants: Harry Price Haas, Atlanta, GA (US); Sesha Devastate Yeruva, Duluth, GA (US); Celia Dayagi, Atlanta, GA (US); Ravikumar Balasubramaniam, Cumming, GA (US); Steven Six, Columbia, SC (US)

(72) Inventors: Harry Price Haas, Atlanta, GA (US); Sesha Devastate Yeruva, Duluth, GA (US); Celia Dayagi, Atlanta, GA (US); Ravikumar Balasubramaniam, Cumming, GA (US); Steven Six, Columbia, SC (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 291 days.

(21) Appl. No.: 17/215,730

(22) Filed: Mar. 29, 2021

(65) Prior Publication Data
US 2022/0305927 A1    Sep. 29, 2022

(51) Int. Cl.
*B60L 53/30* (2019.01)
*B60L 53/67* (2019.01)
*B60L 53/66* (2019.01)
*H04W 84/12* (2009.01)

(52) U.S. Cl.
CPC ............. *B60L 53/305* (2019.02); *B60L 53/66* (2019.02); *B60L 53/67* (2019.02); *H04W 84/12* (2013.01)

(58) Field of Classification Search
CPC .................................................. B60L 53/305
USPC .......................................................... 320/109
See application file for complete search history.

(56) References Cited

U.S. PATENT DOCUMENTS

| 8,796,881 B2* | 8/2014 | Davis .................... B60L 53/305 307/69 |
| 9,041,349 B2* | 5/2015 | Bemmel ............... H02J 7/0013 320/109 |
| 9,831,914 B2* | 11/2017 | Kim ....................... H04B 3/542 |
| 2008/0039979 A1* | 2/2008 | Bridges .................. B60L 55/00 700/286 |
| 2008/0039980 A1* | 2/2008 | Pollack .................. B60L 53/68 700/295 |

(Continued)

FOREIGN PATENT DOCUMENTS

| CN | 110581721 A | 12/2019 |
| EP | 3020597 A1 | 5/2016 |
| WO | 2010120551 A1 | 10/2010 |

*Primary Examiner* — Jerry D Robbins (57) ABSTRACT

A network-based energy management system of managing electric vehicle (EV) charging network infrastructure is provided. The system comprises a gateway including one or more of an electric vehicle supply equipment (EVSE), a building automation system and any other independent controller. The gateway is configured for performing charging authorization, load management and/or demand response on an EVSE network using more than one communication channels including remote and/or local modes. The EVSE network includes two or more components from a group of components including a first EVSE, a controller, a second EVSE, the building automation system, a local server, a remote server and other energy management device.

20 Claims, 5 Drawing Sheets

Smart Building EV Networking Example 3

(56) References Cited

U.S. PATENT DOCUMENTS

| | | | |
|---|---|---|---|
| 2008/0040223 A1* | 2/2008 | Bridges | B60L 53/64 |
| | | | 705/40 |
| 2008/0040263 A1* | 2/2008 | Pollack | B60L 53/14 |
| | | | 705/39 |
| 2008/0040295 A1* | 2/2008 | Kaplan | B60L 53/64 |
| | | | 705/412 |
| 2008/0040296 A1* | 2/2008 | Bridges | G01D 4/004 |
| | | | 705/13 |
| 2008/0040479 A1* | 2/2008 | Bridge | B60L 53/65 |
| | | | 709/224 |
| 2009/0043520 A1* | 2/2009 | Pollack | B60L 3/12 |
| | | | 705/400 |
| 2009/0063680 A1* | 3/2009 | Bridges | B60L 53/20 |
| | | | 709/224 |
| 2012/0197693 A1* | 8/2012 | Karner | B60L 53/31 |
| | | | 705/14.1 |
| 2014/0039703 A1* | 2/2014 | Forbes, Jr. | G05B 19/042 |
| | | | 700/286 |
| 2014/0180922 A1* | 6/2014 | Kim | B60L 53/665 |
| | | | 320/109 |
| 2017/0005515 A1* | 1/2017 | Sanders | H02J 3/388 |
| 2019/0061535 A1* | 2/2019 | Bridges | H02J 3/381 |
| 2019/0061547 A1* | 2/2019 | Vargas-Reighley | |
| | | | H04L 67/125 |
| 2021/0044452 A1 | 2/2021 | Reber et al. | |
| 2021/0107373 A1* | 4/2021 | Nakamura | B60L 53/305 |

* cited by examiner

Provide a gateway including one or more of an electric vehicle supply equipment (EVSE), a building automation system and any other independent gateway controller for network-based energy management of electric vehicle (EV) charging network infrastructure, wherein the gateway is configured for performing charging authorization, load management and/or demand response on an EVSE network using more than one communication channels including remote and/or local modes, wherein the EVSE network includes two or more components from a group of components including an EVSE of the one or more of the EVSE, a programmable logic controller (PLC), an EVSE child, the building automation system, a remote server and other energy management device

NETWORK-BASED ENERGY MANAGEMENT OF ELECTRIC VEHICLE (EV) CHARGING NETWORK INFRASTRUCTURE

BACKGROUND

1. Field

Aspects of the present invention generally relate to network-based energy management of electric vehicle (EV) charging network infrastructure.

2. Description of the Related Art

Synchronization and latency issues impacting electric vehicle supply equipment (EVSE) networks are controlled remotely. Network reliability when using Wi-Fi or Cellular communication is of a concern. This reduces efficiency of load balancing and demand response applications controlling networked EVSEs. Having multiple public facing IP address is higher costs; higher data usage to have multiple clients on the Wi-Fi network.

Network based energy management of EV charging Network Infrastructure typically utilizes Wi-Fi or Cellular based communications. This can pose various challenges in the form of network dropouts, signal strength degradation and network reliability in general. These network issues can contribute to inaccuracies in energy data reporting, delayed/no response to power control commands and authentication requests/responses. For demand response programs, utility servers cannot dynamically control the power level on client devices and see immediate lowering of energy consumption. In more extreme cases such as grid emergencies, inability to stop usage can lead to grid instabilities. Latency in authorizing charging session will not allow the user to charge compromising the primary function of the EV infrastructure. Wi-Fi/Cellular repeaters, hubs and battery backups are installed to address these network reliability issues, which is time consuming as well as not cost effective.

Therefore, there is a need for a better network-based energy management of electric vehicle (EV) charging network infrastructure.

SUMMARY

Briefly described, aspects of the present invention relate to a gateway/controller that accesses all EVSEs in a local network and gathers status as well as send curtailment commands individually. The gateway will receive load balancing/demand response commands, charging profiles, authorization responses from a remote server, based on which it will control the charging flow for all EVSEs in the local network. For example, an EVSE gateway will include OCPP/OPenADr/Local server to MODBUS/BACNET translation. Local communication can be MODBUS, BACNET, Profinet etc. The network is modelled using a parent-child structure/configuration. Regular sync-up can be done from server to send load balancing profiles to a parent unit that can be converted to local commands for child units. The gateway dis-aggregates the commands from a EVSP/Utility server. Each individual charger in the network does not have to be the end point to the aggregator. Network solutions available for EVSEs primarily use wireless communication allowing control from a remote server (Utility, EV service providers etc). Local control for load balancing is also available using local servers, or controllers geared towards building management. A combination of both that allows primary control from a remote server and the local controller/gateway to implement the commands locally to several EVSEs in the wired network will provide a complete network solution for EVSE infrastructure and building management that uses wired networks.

In accordance with one illustrative embodiment of the present invention, a network-based energy management system of managing electric vehicle (EV) charging network infrastructure is provided. The system comprises a gateway including one or more of an electric vehicle supply equipment (EVSE), a building automation system and any other independent controller. The gateway is configured for performing charging authorization, load management and/or demand response on an EVSE network using more than one communication channels including remote and/or local modes. The EVSE network includes two or more components from a group of components including a first EVSE, a controller, a second EVSE, the building automation system, a local server, a remote server and other energy management device.

In accordance with one illustrative embodiment of the present invention, a method for network-based energy management of electric vehicle (EV) charging network infrastructure is provided. The method comprises providing a gateway including one or more of an electric vehicle supply equipment (EVSE), a building automation system and any other independent controller. The gateway is configured for performing charging authorization, load management and/or demand response on an EVSE network using more than one communication channels including remote and/or local modes. The EVSE network includes two or more components from a group of components including a first EVSE, a controller, a second EVSE, the building automation system, a local server, a remote server and other energy management device.

A network-based energy management system of managing electric vehicle (EV) charging network infrastructure comprises a first electric vehicle supply equipment (EVSE) providing connection to a remote or a local server as well as locally connecting to one or more EVSEs performing translation of commands between multiple protocols utilized by the local server or the remote server for device control and energy management. The first EVSE is configured to prioritize and select a command from multiple remote or local commands, and further issues commands to the one or more EVSEs in a network based on a configuration option for the network. The first EVSE can process multiple energy management commands received to derive a charging profile to distribute energy usage for each EVSE over a fixed period of time to meet load balancing needed.

A network-based energy management system of managing electric vehicle (EV) charging network infrastructure comprises a first electric vehicle supply equipment (EVSE) providing connection to one or more remote or local servers as well as locally connecting to one or more EVSEs performing translation of commands between multiple protocols utilized by one or more servers for device control and energy management. The first EVSE is configured to prioritize and select a command from multiple remote or local commands, and further issues commands to the one or more EVSEs in a network The first EVSE can process multiple energy management commands received to derive a charging profile to distribute energy usage for each EVSE dynamically or over a fixed period of time.

A network-based energy management system of managing electric vehicle (EV) charging network infrastructure comprises a first electric vehicle supply equipment (EVSE) providing connection to one or more remote or local servers as well as locally connecting to one or more EVSEs performing translation of commands between multiple protocols utilized by one or more servers for device control and energy management. The first EVSE is configured to select a command from multiple remote or local commands, and further issues commands to the one or more EVSEs in a network based on a configuration option for the network. The first EVSE can process multiple energy management commands received to derive a charging profile to distribute energy usage for each EVSE dynamically or over a fixed period of time.

DETAILED DESCRIPTION

To facilitate an understanding of embodiments, principles, and features of the present invention, they are explained hereinafter with reference to implementation in illustrative embodiments. In particular, they are described in the context of a network-based energy management system for managing electric vehicle (EV) charging network infrastructure. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the network-based energy management system according to the present disclosure are described below with reference to FIGS. 1-5 herein. Like reference numerals used in the drawings identify similar or identical elements throughout the several views. The drawings are not necessarily drawn to scale.

Figure 1:
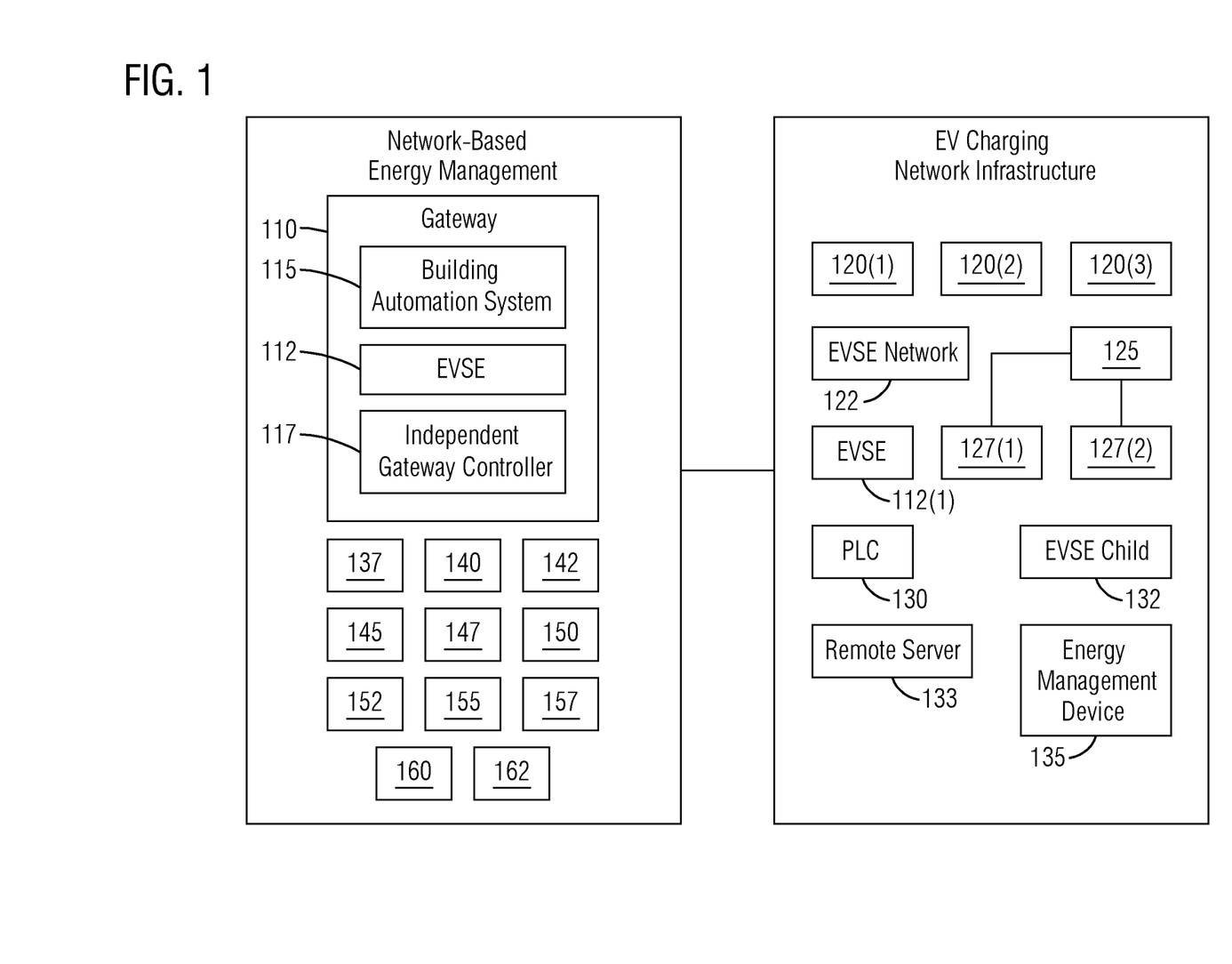
FIG. 1 illustrates a block diagram of a network-based energy management system for managing electric vehicle (EV) charging network infrastructure in accordance with an exemplary embodiment of the present invention.

Consistent with one embodiment of the present invention, FIG. 1 represents a block diagram of a network-based energy management system 105 in accordance with an exemplary embodiment of the present invention. The network-based energy management system 105 is configured to manage electric vehicle (EV) charging network infrastructure 107. The network-based energy management system 105 comprises a gateway 110 including one or more of an electric vehicle supply equipment (EVSE) 112, a building automation system 115 and any other independent gateway controller 117.

The gateway 110 is configured for performing charging authorization 120(1), load management 120(2) and/or demand response 120(3) on an EVSE network 122 using more than one communication channels 125 including remote 127(1) and/or local modes 127(2). The EVSE network includes two or more components from a group of components including a first EVSE being a parent EVSE (an EVSE 112(1) of the one or more of the EVSE 112), a controller, a second EVSE being an EVSE child, the building automation system, a local server (e.g., 210, 310, 410), a remote server and other energy management device. The EVSE network 122 includes two or more components from a group of components including the EVSE 112(1) of the one or more of the EVSE 112, a programmable logic controller (PLC) 130, an EVSE child 132, the building automation system 115, a remote server 133 and other energy management device 135.

The gateway 110 accesses all EVSEs 112 in a local network 137 and gathers status 140 as well as sends curtailment commands 142 individually. The gateway 110 receives load balancing 145, demand response commands 147, charging profiles 150, authorization responses 152 from the remote server 133, based on which the gateway 110 controls a charging flow for all EVSEs 112 in the local network 137. The gateway 110 includes cellular/Wi-Fi to serial/ethernet translation 155.

The EVSE network 122 is modelled using a parent-child structure/configuration 157 such that a regular sync-up is done from the remote server 133 by sending load balancing profiles 160 to the EVSE 112(1) which are then converted into local commands 162 to the EVSE child 132. The remote server 133 is a utility/EVSP/cloud server such that the gateway 110 dis-aggregates commands from the utility/EVSP/cloud server. A combination of a primary control from the remote server 133 and a local control from the gateway 110 to implement the commands locally to all EVSEs 112 in a wired network provides a complete network solution.

Method of performing charging authorization, load management and/or demand response on the EVSE network 122 is presented using more than one communication channels including remote and/or local modes. The EVSE network 122 can consist of two or more components listed next: 1. an EVSE parent, 2. a PLC controller, 3. an EVSE child, 4. a building automation system, 5. remote server and 6. other independent device.

The above method can be implemented in the gateway 110 that consists of one or more of the listed devices—EVSE parent, building automation system and/or any other independent gateway controller. Remote communication involves establishing end to end communication with a server managed by an Electric Vehicle service provider, Utility or Custom server (Versicloud—an EVSE server)

A cellular network is preferred to communicate to the remote server 133 when compared to Wi-Fi to improve network reliability. Authorization, energy management, other control functions (charging start/stop) can be configured to be controlled by remote or local protocol (examples: OCPP, MODBUS) and/or plurality of communication channels. System configuration will allow selection between cellular vs Wi-Fi network to establish connection with the remote server 133.

The gateway 110 can handle one or more of the following functions. Allow/Not allow charging, Monitor and control energy loads for demand, Initial charger setup, System configuration and network set-up, and Auto/Manual download of updates/fixes. System configuration will allow selection between RS485 serial, MODBUS TCP/IP over ethernet or wireless, BACNET, Zigbee, Bluetooth, TCP/IP connection between the EVSE parent/gateway 110 and the child units in the network. Here protocols are for example purposes only.

Authorization of charging sessions are provided using local and remote mechanisms including use of RFID cards; Manage QR code and RFID billing. Multi-protocol translation in two or more networks is provided. (e.g., one network (OCPP/Open ADR) to other (MODBUS/BACNET) network)

The method performs dynamic local energy aggregation using load balancing schemes/charging profiles issued by the local/remote server or set by the user. The method synchronizes with the remote server 133 to download charging profiles or load balancing schemes. The method decides final command to be executed from multiple communication channels/protocols based on internal load balancing scheme.

Load balancing scheme will be dynamically adjusted based on priorities assigned to various control agents (OCPP server, MODBUS master, Open ADR, EVSE cloud server etc.) The method collects and evaluates meter data from all loads in a grid, including EVSEs and appropriate load balancing schemes based on set criterion.

A network-based energy management system of managing electric vehicle (EV) charging network infrastructure comprises the first electric vehicle supply equipment (EVSE) 112(1) providing connection to a remote or a local server as well as locally connecting to one or more EVSEs performing translation of commands between multiple protocols utilized by the local server or the remote server for device control and energy management. The first EVSE 112(1) is configured to prioritize and select a command from multiple remote or local commands, and further issues commands to the one or more EVSEs in a network based on a configuration option for the network. The first EVSE 112(1) can process multiple energy management commands received to derive a charging profile to distribute energy usage for each EVSE over a fixed period of time to meet load balancing needed.

A network-based energy management system of managing electric vehicle (EV) charging network infrastructure comprises the first electric vehicle supply equipment (EVSE) 112(1) providing connection to one or more remote or local servers as well as locally connecting to one or more EVSEs performing translation of commands between multiple protocols utilized by one or more servers for device control and energy management. The first EVSE 112(1) is configured to prioritize and select a command from multiple remote or local commands, and further issues commands to the one or more EVSEs in a network The first EVSE 112(1) can process multiple energy management commands received to derive a charging profile to distribute energy usage for each EVSE dynamically or over a fixed period of time.

A network-based energy management system of managing electric vehicle (EV) charging network infrastructure comprises the first electric vehicle supply equipment (EVSE) 112(1) providing connection to one or more remote or local servers as well as locally connecting to one or more EVSEs performing translation of commands between multiple protocols utilized by one or more servers for device control and energy management. The first EVSE 112(1) is configured to select a command from multiple remote or local commands, and further issues commands to the one or more EVSEs in a network based on a configuration option for the network. The first EVSE 112(1) can process multiple energy management commands received to derive a charging profile to distribute energy usage for each EVSE dynamically or over a fixed period of time.

Figure 2:
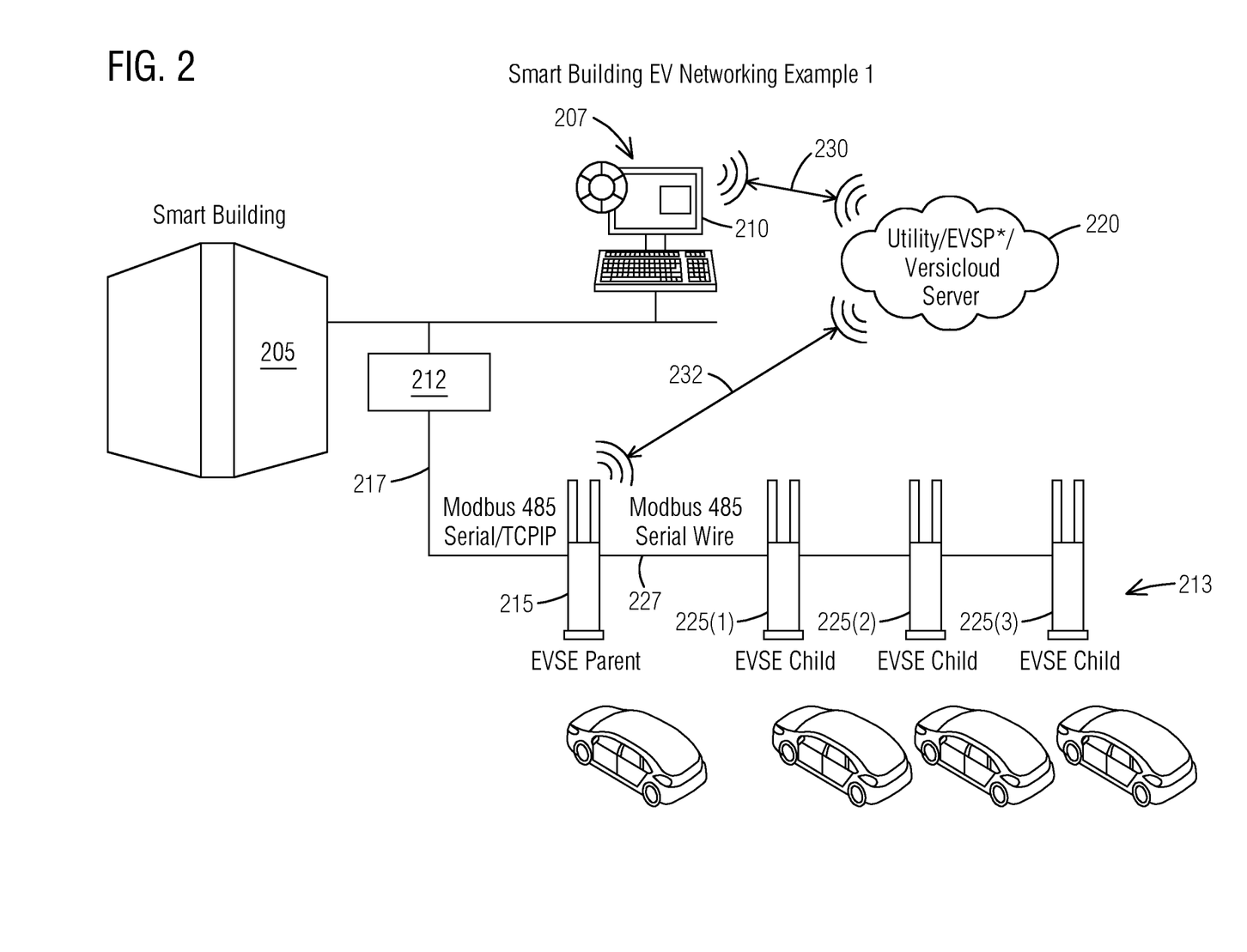
FIG. 2 illustrates a schematic view of smart building EV networking example 1 in accordance with an exemplary embodiment of the present invention.

Referring to FIG. 2, it illustrates a schematic view of smart building EV networking example 1 in accordance with an exemplary embodiment of the present invention. A smart building 205 includes a building management system 207 having a PC gateway 210 and a programmable logic controller (PLC) 212. In a network-based energy management of electric vehicle (EV) charging network infrastructure, an EVSE network 213 includes an EVSE parent 215 and EVSE children 225(1-3).

The PC gateway 210 is connected to a remote server being a utility/EVSP/cloud server 220 via a wireless internet connection 230. The EVSE parent 215 is connected to the remote server being the utility/EVSP/cloud server 220 via a wireless cellular/Wi-Fi connection 232.

The building management system 207 is connected to the EVSE parent 215 via a first MODBUS 485 serial/ethernet connection 217. The EVSE parent 215 is connected to the remote server being the utility/EVSP/cloud server 220 via the cellular/Wi-Fi connection 232. The EVSE parent 215 is connected to an EVSE child 225(1) via a second MODBUS 485 serial/ethernet connection 227.

Figure 3:
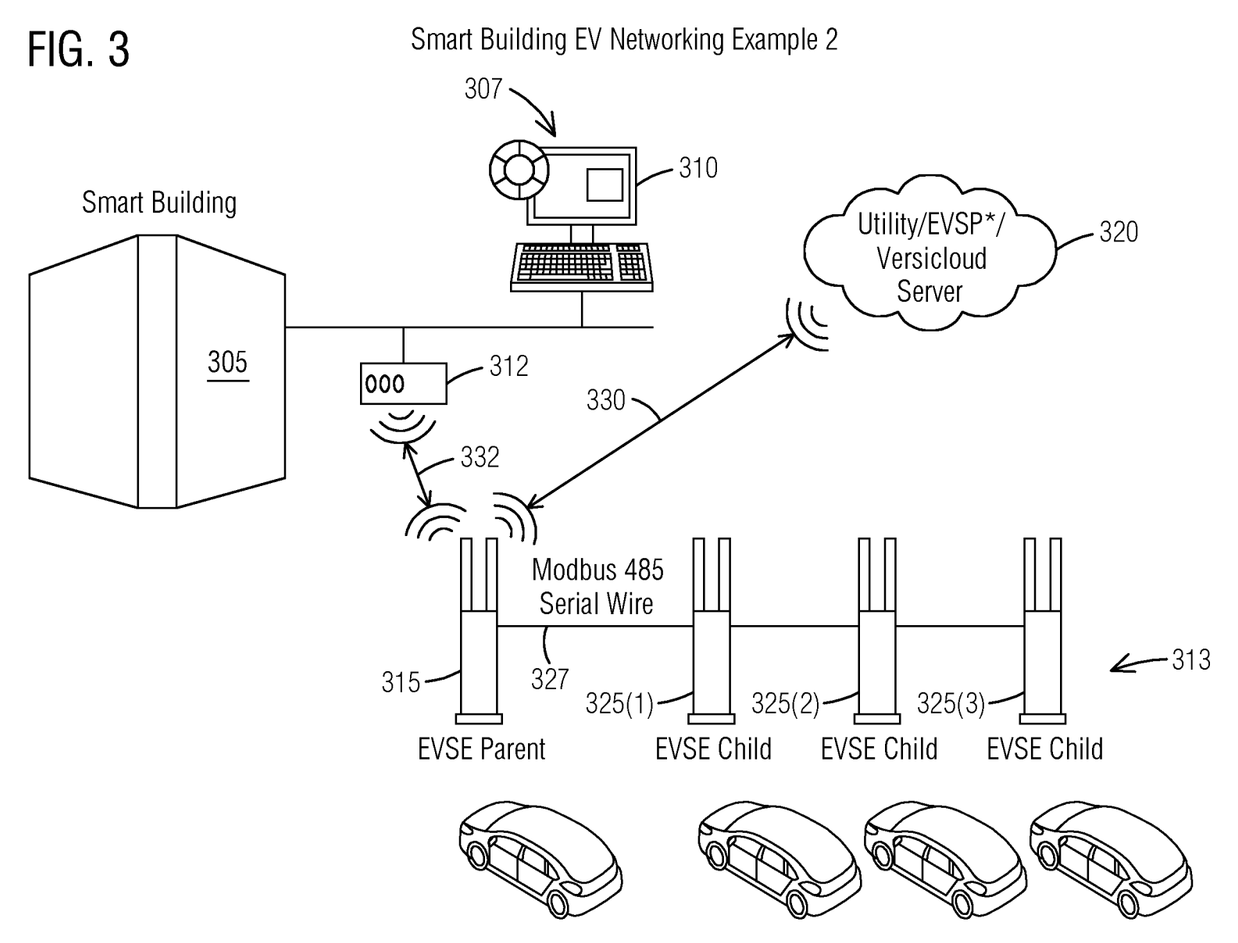
FIG. 3 illustrates a schematic view of smart building EV networking example 2 in accordance with an exemplary embodiment of the present invention.

Turning now to FIG. 3, it illustrates a schematic view of smart building EV networking example 2 in accordance with an exemplary embodiment of the present invention. A smart building 305 includes a building management system 307 having a PC gateway 310 and a Bluetooth/Zigbee/Modbus TCP/IP receiver 312. In a network-based energy management of electric vehicle (EV) charging network infrastructure, an EVSE network 313 includes an EVSE parent 315 and EVSE children 325(1-3).

The EVSE parent 315 is connected to a remote server being a utility/EVSP/cloud server 320 via a wireless cellular/Wi-Fi connection 330. The EVSE parent 215 is connected to the Bluetooth/Zigbee/Modbus TCP/IP receiver 312 via a Bluetooth/Zigbee/Modbus TCP/IP connection 332.

The building management system 307 is connected to the EVSE parent 315 via a local Wi-Fi network using a Bluetooth/Zigbee/Modbus TCP/IP protocol. The EVSE parent 315 is connected to an EVSE child 325(1) via a MODBUS 485 serial/ethernet connection 327.

Figure 4:
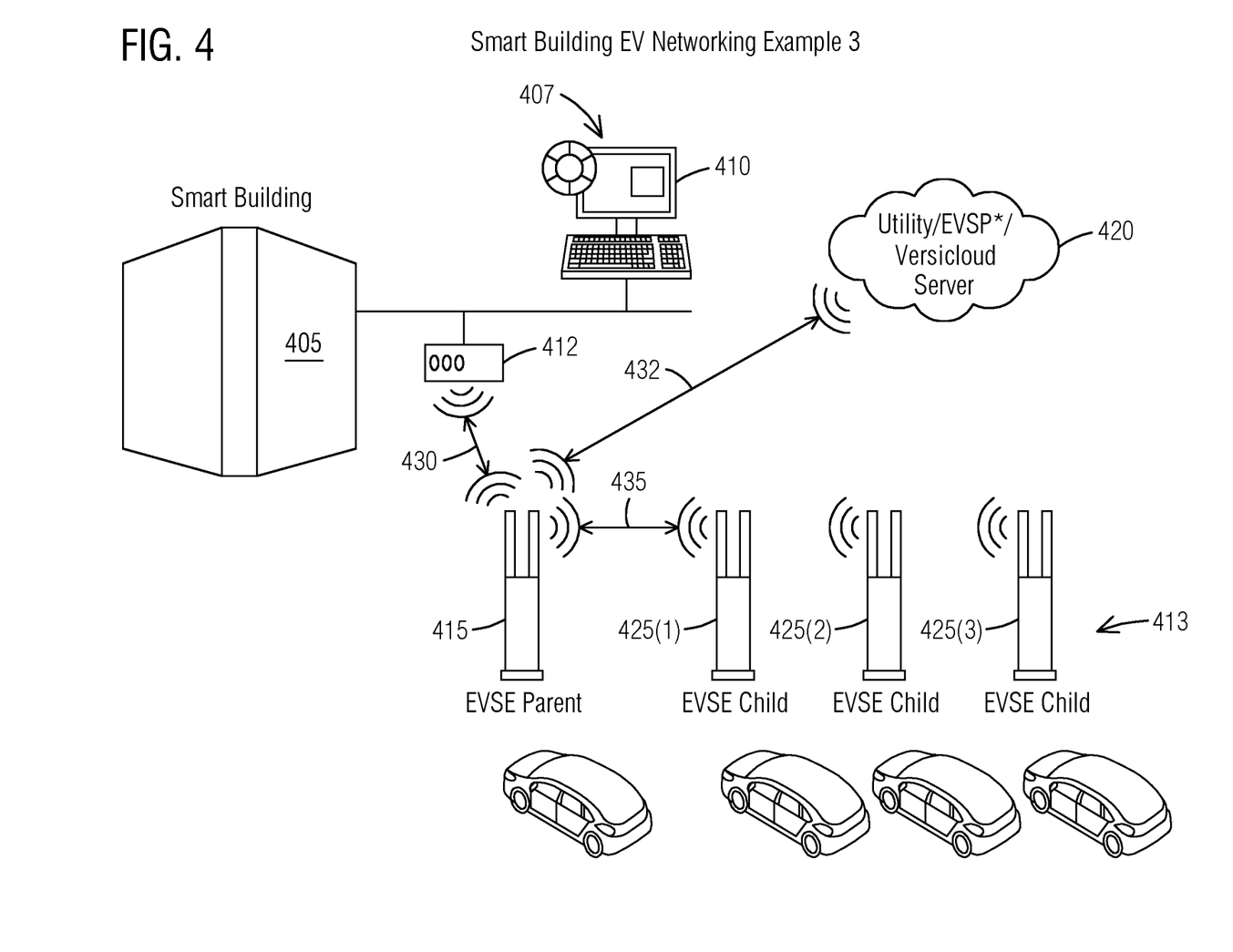
FIG. 4 illustrates a schematic view of smart building EV networking example 3 in accordance with an exemplary embodiment of the present invention.

FIG. 4 illustrates a schematic view of smart building EV networking example 3 in accordance with an exemplary embodiment of the present invention. A smart building 405 includes a building management system 407 having a PC gateway 410 and a Bluetooth/Zigbee/Modbus TCP/IP receiver 412. In a network-based energy management of electric vehicle (EV) charging network infrastructure, an EVSE network 413 includes an EVSE parent 415 and EVSE children 425(1-3).

The building management system 407 is connected to the EVSE parent 415 via a local wireless Wi-Fi network connection 430 using a Bluetooth/Zigbee/Modbus TCP/IP protocol. The EVSE parent 415 is connected to a remote server being a utility/EVSP/cloud server 420 via a wireless cellular/Wi-Fi connection 432. The EVSE parent 415 is connected to the EVSE child 425(1) via a Bluetooth/Zigbee/Modbus TCP/IP connection 435 using a Bluetooth/Zigbee/Modbus TCP/IP protocol.

Figure 5:
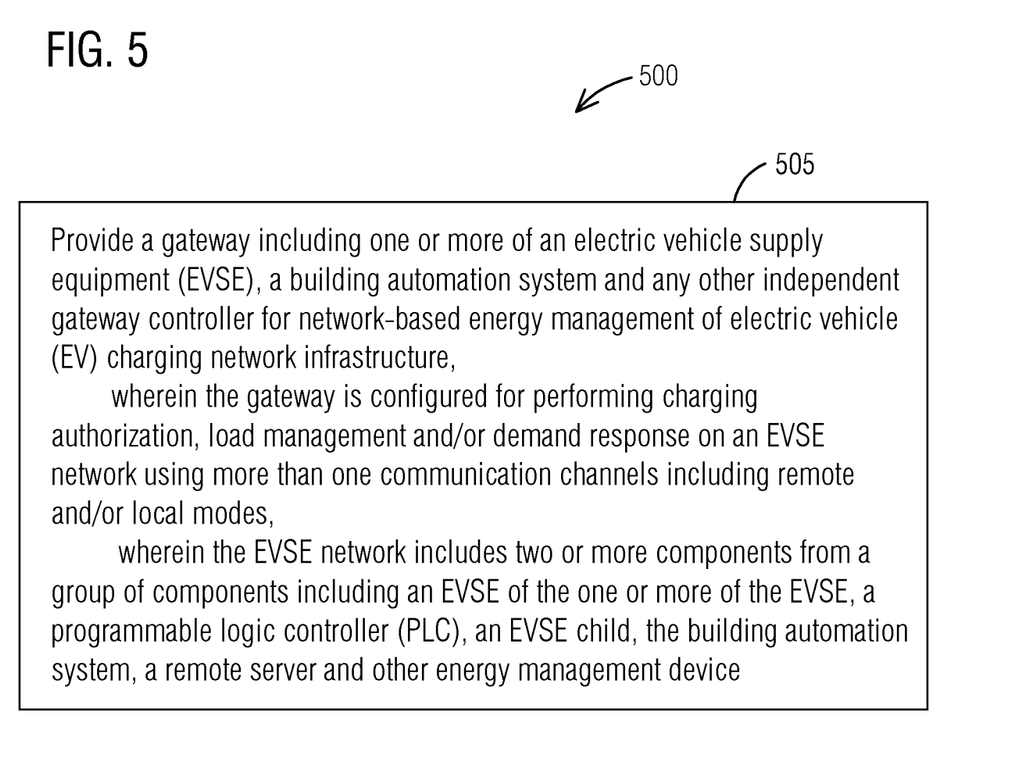
FIG. 5 illustrates a schematic view of a flow chart of a method for managing electric vehicle (EV) charging network infrastructure by a network-based energy management system in accordance with an exemplary embodiment of the present invention.

FIG. 5 illustrates a schematic view of a flow chart of a method 500 for managing electric vehicle (EV) charging network infrastructure by a network-based energy management system in accordance with an exemplary embodiment of the present invention. Reference is made to the elements and features described in FIGS. 1-4. It should be appreciated that some steps are not required to be performed in any particular order, and that some steps are optional.

The method 500 comprises a step 505 of providing the gateway 110 including one or more of an EVSE, a building automation system and any other independent gateway controller. The gateway 110 is configured for performing charging authorization, load management and/or demand response on an EVSE network using more than one communication channels including remote and/or local modes. The EVSE network includes two or more components from a group of components including an EVSE of the one or more of the EVSE, a programmable logic controller (PLC), an EVSE child, the building automation system, a remote server and other energy management device.

While three use cases as examples 1-3 are described here a range of one or more other types of use cases or other forms of use cases are also contemplated by the present invention. For example, other types of use cases may be implemented based on one or more features presented above without deviating from the spirit of the present invention.

The techniques described herein can be particularly useful for a building automation system. While particular embodiments are described in terms of specific configuration of a building automation system, the techniques described herein are not limited to such a limited configuration but can also be used with other configurations and types of automation systems.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A network-based energy management system of managing electric vehicle (EV) charging network infrastructure, comprising:
    a gateway including one or more of an electric vehicle supply equipment (EVSE), a building automation system and an additional independent gateway controller,
        wherein the gateway is configured for performing charging authorization, load management and/or demand response on an EVSE network using more than one communication channels including remote and/or local modes,
        wherein the EVSE network includes two or more components from a group of components including a first EVSE, a controller, a second EVSE, the building automation system, a local server, a remote server and other energy management device,
        wherein the first EVSE selects a command from one or more remote or local commands, and further issues commands to one or more EVSEs in a network such that the network is modelled using a parent—child structure/configuration in that a regular sync-up can be done from a server to send load balancing profiles to a parent unit that can be converted to local commands for child units,
        wherein a parent EVSE acts as a network access point to a child EVSE as the parent EVSE is connected to the child EVSE via a network connection on a paired wireless network, a personal area wireless ad hoc network or a client-server wired network, and
        wherein the parent EVSE can process multiple energy management commands received to derive a charging profile and also act as a pass through medium to the child EVSE through its network connection.

2. The network-based energy management system of claim 1, wherein the gateway accesses all EVSEs in a local network and gathers status as well as sends curtailment commands individually and gets device information including meter data from all EVSEs.

3. The network-based energy management system of claim 2, wherein the gateway receives load balancing, demand response commands, charging profiles, authorization responses from the local server or the remote server, based on which the gateway controls a charging flow for all EVSEs in the local network.

4. The network-based energy management system of claim 1, wherein the gateway includes cellular/Wi-Fi to serial/ethernet translation.

5. The network-based energy management system of claim 1, wherein the EVSE network is modelled using the parent—child structure/configuration such that the regular sync-up is done from the remote server by sending load balancing profiles to the first EVSE which are then converted into the local commands to the second EVSE being an EVSE child.

6. The network-based energy management system of claim 1, wherein the remote server is a utility/EVSP/cloud server such that the gateway dis-aggregates commands from the utility/EVSP/cloud server.

7. The network-based energy management system of claim 1, wherein a combination of a primary control from the remote server and a local control from the gateway to implement the commands locally to all EVSEs in a wired network provides a complete network solution.

8. The network-based energy management system of claim 1,
    wherein a building management system is connected to the first EVSE via a first MODBUS 485 serial/ethernet connection,
    wherein the first EVSE is connected to the remote server being a utility/EVSP/cloud server via a cellular/Wi-Fi connection, and
    wherein the first EVSE is connected to the second EVSE via a second MODBUS 485 serial/ethernet connection.

9. The network-based energy management system of claim 1,
    wherein a building management system is connected to the first EVSE via a local Wi-Fi network using a Bluetooth/Zigbee/Modbus TCP/IP protocol,
    wherein the first EVSE is connected to the remote server being a utility/EVSP/cloud server via a cellular/Wi-Fi connection, and
    wherein the first EVSE is connected to the second EVSE via a MODBUS 485 serial/ethernet connection.

10. The network-based energy management system of claim 1,
    wherein a building management system is connected to the first EVSE via a local Wi-Fi network using a Bluetooth/Zigbee/Modbus TCP/IP protocol,
    wherein the first EVSE is connected to the remote server being a utility/EVSP/cloud server via a cellular/Wi-Fi connection, and
    wherein the first EVSE is connected to the second EVSE using a Bluetooth/Zigbee/Modbus TCP/IP protocol.

11. A method for network-based energy management of electric vehicle (EV) charging network infrastructure, the method comprising:
    providing a gateway including one or more of an electric vehicle supply equipment (EVSE), a building automation system and an additional independent gateway controller,
        wherein the gateway is configured to access all EVSEs in a local network and gather status as well as send commands individually,
        wherein the gateway is configured for performing charging authorization, load management and/or demand response on an EVSE network using more than one communication channels including remote and/or local modes,
        wherein the EVSE network includes two or more components from a group of components including a first EVSE, a controller, a second EVSE, the building automation system, a local server, a remote server and other energy management device,
        wherein the first EVSE selects a command from one or more remote or local commands, and further issues commands to one or more EVSEs in a network such that the network is modelled using a parent—child structure/configuration in that a regular sync-up can be done from a server to send load balancing profiles to a parent unit that can be converted to local commands for child units, wherein a parent EVSE acts as a network access point to a child EVSE as the parent EVSE is connected to the child EVSE via a network connection on a paired wireless network, a personal area wireless ad hoc network or a client-server wired network, and wherein the parent EVSE can process multiple energy management commands received to derive a charging profile and also act as a pass through medium to the child EVSE through its network connection.

12. The method of claim 11, wherein the gateway accesses all EVSEs in a local network and gathers status as well as sends curtailment commands individually and gets device information including meter data from all EVSEs.

13. The method of claim 12, wherein the gateway receives load balancing, demand response commands, charging profiles, authorization responses from the local server or the remote server, based on which the gateway controls a charging flow for all EVSEs in the local network.

14. The method of claim 11, wherein the gateway includes cellular/Wi-Fi to serial/ethernet translation.

15. The method of claim 11, wherein the EVSE network is modelled using the parent—child structure/configuration such that the regular sync-up is done from the remote server by sending load balancing profiles to the first EVSE which are then converted into the local commands to the second EVSE being an EVSE child.

16. The method of claim 11, wherein the remote server is a utility/EVSP/cloud server such that the gateway disaggregates commands from the utility/EVSP/cloud server.

17. The method of claim 11, wherein a combination of a primary control from the remote server and a local control from the gateway to implement the commands locally to all EVSEs in a wired network provides a complete network solution.

18. The method of claim 11,
wherein a building management system is connected to the first EVSE via a first MODBUS 485 serial/ethernet connection,
wherein the first EVSE is connected to the remote server being a utility/EVSP/cloud server via a cellular/Wi-Fi connection, and
wherein the first EVSE is connected to the second EVSE via a second MODBUS 485 serial/ethernet connection.

19. The method of claim 11,
wherein a building management system is connected to the first EVSE via a local Wi-Fi network using a Bluetooth/Zigbee/Modbus TCP/IP protocol,
wherein the first EVSE is connected to the remote server being a utility/EVSP/cloud server via a cellular/Wi-Fi connection, and
wherein the first EVSE is connected to the second EVSE via a MODBUS 485 serial/ethernet connection.

20. The method of claim 11,
wherein a building management system is connected to the first EVSE via a local Wi-Fi network using a Bluetooth/Zigbee/Modbus TCP/IP protocol,
wherein the first EVSE is connected to the remote server being a utility/EVSP/cloud server via a cellular/Wi-Fi connection, and
wherein the first EVSE is connected to the second EVSE using a Bluetooth/Zigbee/Modbus TCP/IP protocol.

* * * * *